Figure 1:
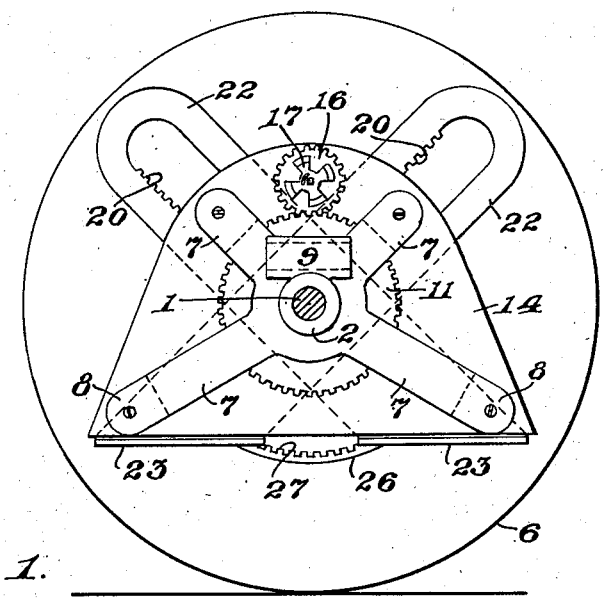

March 2, 1948.  M. J. MADISON  2,437,108
CHOCKS FOR AIRCRAFT AND OTHER VEHICLES
Filed June 27, 1945  2 Sheets-Sheet 1

Martin J. Madison, INVENTOR

BY
J. Stuart Freeman
ATTORNEY

March 2, 1948.  M. J. MADISON  2,437,108
CHOCKS FOR AIRCRAFT AND OTHER VEHICLES
Filed June 27, 1945  2 Sheets-Sheet 2
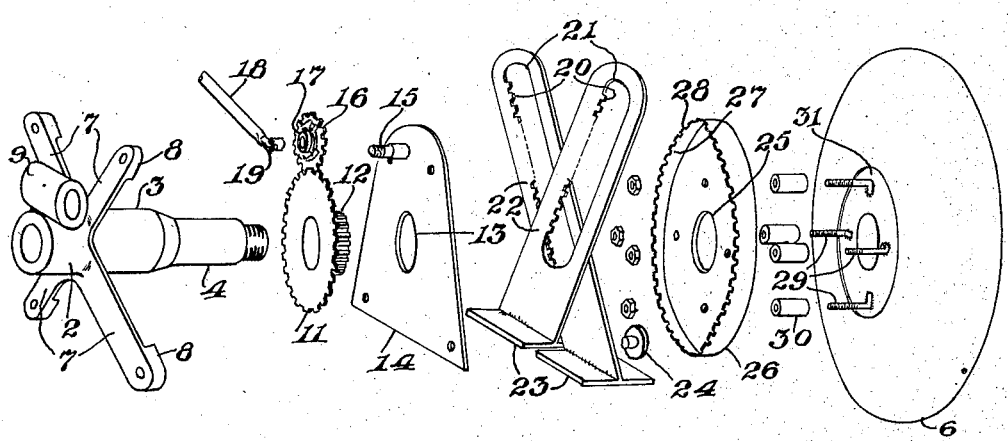
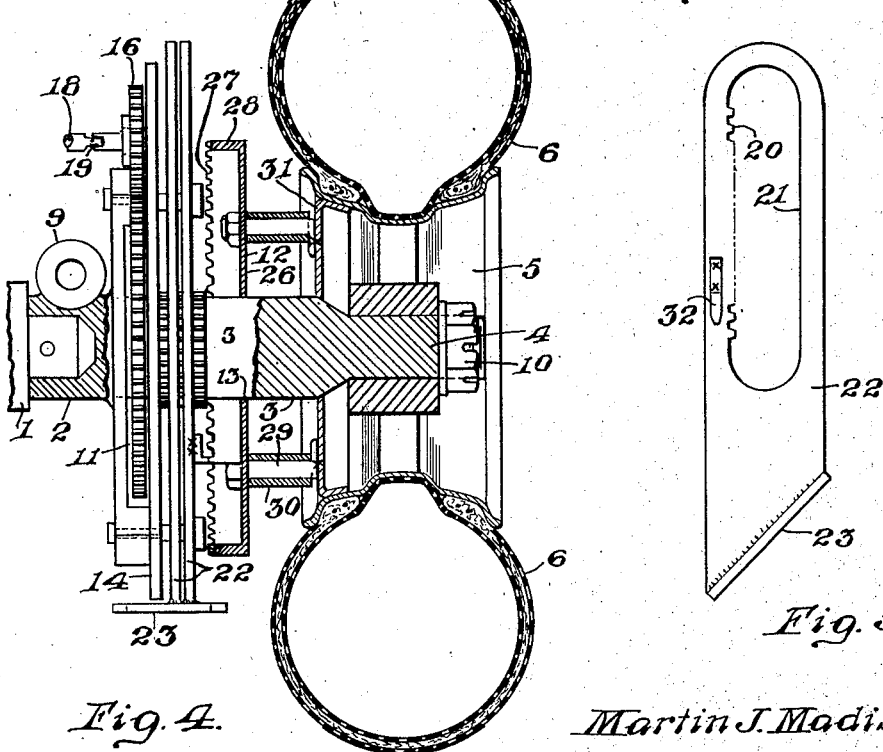
Fig. 3.
Fig. 4.
Fig. 5.
Martin J. Madison,
INVENTOR
BY J. Stuart Freeman,
ATTORNEY

Patented Mar. 2, 1948

2,437,108

UNITED STATES PATENT OFFICE 2,437,108

CHOCK FOR AIRCRAFT AND OTHER VEHICLES

Martin J. Madison, Oteen, N. C.

Application June 27, 1945, Serial No. 601,855

6 Claims. (Cl. 188—5)

The object of the invention is to provide improvements in chocks for automotive vehicles, but more especially for airplanes and the like, and at the same time to provide a double chock that is particularly adapted for use with military planes in association with aircraft carriers, where the roll and pitch of the ship makes it mandatory to chock a plane's wheels both fore and aft in order to prevent it from rolling in either direction until under its own power; also to provide a simple and efficient means for attaching skis to an airplane, whereby a shift from wheels to skis may be made by the pilot or other crew members during flight; and likewise to provide chocks secured to the landing gear of a plane and thereby operative to prevent theft of and "joy hopping" in such plane.

Practically if not all chocking of airplanes is at present effected by means of wooden blocks or the like, that are placed in front of a plane's wheels at an airport, or both in front and to the rear of a plane's wheels upon a carrier's deck, thus making it necessary for one or more persons other than the crew aboard the ship to chock and unchock the ship from without, as mere application of a plane's brakes has been found insufficiently positive to prevent its unintentional movement, as for instance in a heavy wind or when a carrier's deck is slanting at an excessive angle in a rough sea.

When the brakes alone are applied, the only factor resisting the movement of the plane upon a supporting surface is the friction of but a small portion of the peripheral surface of its tires with said supporting surface, and under certain extreme conditions this has been found to be insufficient for purposes of full safety, wherefore the customary chocks are employed, thereby placing actual obstacles in the way of the wheels, to avoid which it would be necessary for the plane to "climb" over the chock against the additional force of gravity, and this has been found to be most unlikely even under the conditions normally met with, plus a generous coefficient of safety.

Another object, therefore, is to provide an improved chock mechanism that can be built into the landing gear of a plane at the time of manufacture, and that can be manipulated by the pilot or other person within the cabin or fuselage, while instead of needing two or more independent chocks, those provided by the present invention are simultaneously actuated into operative and inoperative positions by a single motion of the pilot or other individual aboard the plane.

A further object is to provide a double chock for each wheel of a plane, comprising chocking members that offer a minimum of resistance to the flow of air past them during flight, and that are adapted to simultaneously move radially of the adjacent wheel in angularly related directions, so as to approach the surface supporting the plane well in advance and to the rear of a point vertically beneath the axis of said wheel.

Still another object is to provide a chock of this nature, which is closely associated with the transverse overall width of the wheel and tire, and thereby projects therefrom only a minimum distance; while being composed of relatively few parts and these of the simplest form and operation.

Figure 2:
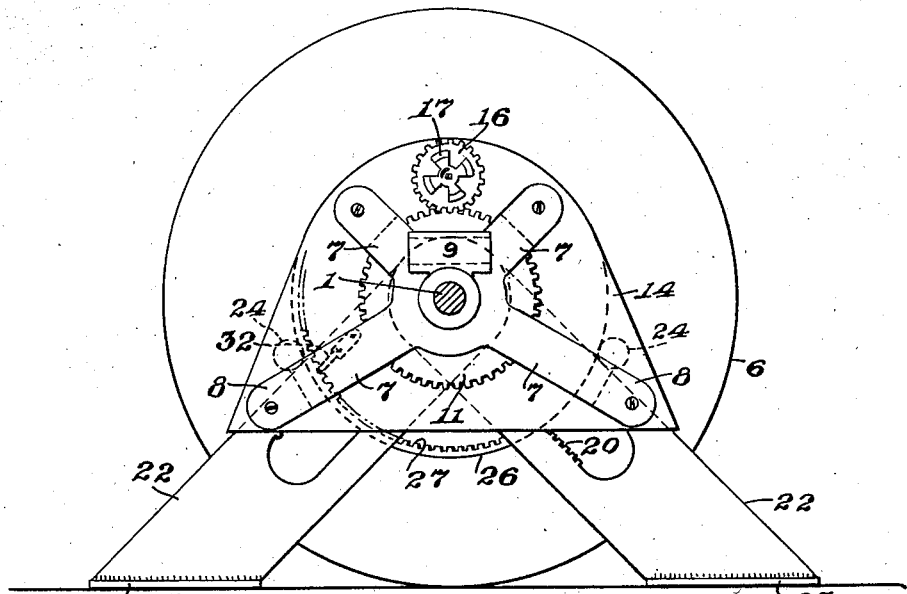

With the objects thus briefly stated, the invention comprises further details of construction and operation, that are hereinafter fully brought out in the following description, when read in conjunction with the accompanying drawings, in which Fig. 1 is an inboard side elevation of an airplane wheel with one embodiment of the improved double chock operatively associated therewith and shown in retracted position; Fig. 2 is a similar view but showing the chocking members of the improved chock in extended operative positions; Fig. 3 is an "exploded" view showing the principal parts of the device unassembled but in alignment for normal assembly; Fig. 4 is an enlarged transverse vertical section through the axis of the device and adjacent wheel, as shown in Fig. 1, the several parts of the device being assembled in greater separation than in actual practice in order to show the construction and operation more clearly; and Fig. 5 is an elevational view of one of the chock members per se.

Referring to the drawings, it is considered unnecessary to illustrate a complete airplane or other form of air transport which is supported by and upon wheels when at rest, and so the entire plane or similar vehicle is symbolically represented merely by a fragmentary portion 1 of a stud or the like, to which is secured in any suitable manner an axle member 2, which is principally composed of an enlarged body portion 3, from which axially extends a reduced shaft portion 4, upon which is rotatably mounted the usual wheel 5 carrying the tire 6. It will be understood that the tire and its mounting per se are merely represented schematically, as their exact form and arrangement comprises no part of the invention and in view of which fact none of the customary anti-friction bearings and their housing are shown.

The said axle member further comprises a plurality of angularly related, radially extending arms 7, respectively provided with reinforced heads 8, while to the inner enlarged portion of said member there is preferably integrally secured a suitable bored enlargement 9, by means of which any desired form of mechanism may be connected to said member as for tilting the wheels angularly into retracted position, for preventing the stud 3 from turning, or for any other purpose that may be desired. It will also be noted the outer free end of said shaft is threaded to provide for the reception of a wheel-securing nut 10 or the like.

Slidably and rotatably mounted upon the body portion 3 of said stud is a double-gear element, comprising a larger gear 11 and a smaller axially elongated gear 12, the latter projecting through and being rotatable slidably within an aperture 13 in a plate 14, which is secured by bolts to the head portions 8 of the respective radial arms 7 of said stud. To an upper portion of said plate there is secured a short stud 15 upon which is rotatably mounted a small gear or pinion 16 that meshes with the larger gear 11, and which through any desired ratchet or other suitable medium 17 is connected to a torque tube 18, having one or more universal joints 19. By this arrangement, the pilot or another individual within the cabin of a plane or other vehicle is able either manually or by means of an electric actuator to rotate the gears 16 and 11 and thereby the elongated gear 12, which, by referring to Fig. 4, will be seen as extending well through the aperture 13 in said plate 14, and into meshed engagement with the rack teeth 20, which line one side or edge only of an elongated slot 21 in each of the chock members 22, each of which members is preferably provided with transversely enlarged feet 23, adapted to directly engage the deck of a carrier, the ground at an airport, or other surface upon which the vehicle may be resting, so that, regardless of surface level or firmness of terrain, air pressures in tires and other factors, the new device effects secure and positive chocking.

It should be noted that the said feet 23 may be of any shape and transverse extent, but that they should be in such relative positions and alignment that together they offer a minimum of drag while the vehicle is in flight. Each of said chock members is furthermore restrained so as to move longitudinally per se, and in angularly related paths with respect to each other, by means of a plurality of guide wheels or rollers 24, carried by studs mounted upon said plate 14, as said members are alternately shifted into retracted and extended positions (Figs. 1 and 2, respectively) by said gear 12.

Also surrounding the enlarged portion 3 of said supporting stud by means of a central aperture 25 is a disc gear 26 provided with axially projecting notches 27 (or circumferentially spaced radial holes) carried by a cylindrical flange 28. This disc gear is secured by suitable bolts 29 and spacers 30 to the hub portion 31 of the wheel 5, as clearly indicated in Fig. 4. It will be noted that each of the chock members is provided upon its outboard surface with a longitudinally extending boss or spur 32, which when its supporting member is in extended position engages between a pair of adjacent notches (or within a radial hole), so as to thereby prevent rotation of the wheel 5 and its tire 6.

With a construction such as that described, and the several parts in the retracted positions shown in Fig. 1, rotation of the torque tube 18, either manually or through an electric actuator, by one within or carried by the plane or other vehicle or from outside of the same, if preferred, operates to rotates the gears 16, 11 and 12, thereby shifts the chock members 22 longitudinally downwardly and outwardly until their feet 23 engage the surface upon which the vehicle may be resting, and in which extended positions the spurs 32 are caused to engage between pairs of notches 27 (or in a hole) upon the circular rack or gear 28, to thereby lock said wheel and prevent further rotation of the tire 6. Reverse rotation of said torque tube similarly causes said chock members to be retracted into the positions shown in Fig. 2 while at the same time withdrawal of the spurs from engagement with said notches 27 (or from a hole in flange 28) instantly permits the wheel and tire to rotate freely.

From this description it is clear that a broad principle of vehicle-carried chocks is involved, and that the details of construction and operation of a single embodiment, such as that shown in the drawings, is of relatively secondary importance, since many mechanisms are conceivable by which said principle may be put into practice for more or less efficient operation.

Having thus described my invention, what I claim and desire to protect by Letters Patent of the United States is:

1. The combination of a vehicle frame, a wheel rotatably carried by said frame, a pair of chocking members also carried by said frame and restrained to move in paths angularly related to each other and radially with respect to said wheel, and means to simultaneously shift said members into extended and retracted positions.

2. The combination of a vehicle frame, a wheel rotatably carried by said frame, a pair of chocking members also carried by said frame and restrained against movement other than radially of said wheel, each of said members having a set of rack teeth, a gear in mesh with and common to both sets of teeth, and means supported by said frame for remote simultaneous actuation of said members selectively into extended and retracted positions by a person also supported by said frame.

3. The combination of an axle, a vehicle wheel rotatably carried thereby, a circular arrangement of irregularities carried by and concentric with said wheel, a stationay plate, a pair of chock members reciprocatable in angularly related paths, means carried by said plate to limit movement of said members to their respective paths, each member being provided with a set of rack teeth, a gear rotatably carried by said axle and engaging said rack teeth to reciprocate said members alternately in opposite directions, and a spur carried by one of said members and engageable with said irregularities when its supporting member is in extended position to prevent rotation of said wheel.

4. The combination of an axle, a vehicle wheel rotatably carried thereby, a pair of chock members reciprocatable in angularly related paths, a stationary plate carried by said axle, mens carried by said plate to restrict movement of said members to their respective paths, and actuating means to concurrently reciprocate said members alternately in opposite directions.

5. The combination of an axle, a vehicle wheel rotatably carried thereby, a pair of elongated chock members having elongated apertures through which said axle extends and a set of rack teeth upon one side of each of said apertures, a plate fixed with respect to said axle, means carried by said plate to limit movement of said members to angularly related, downwardly divergent paths, a gear carried by said axle and simultaneously engaging said rack teeth, and means to rotate said gear in opposite directions from a remote position, to shift said members into engagement with the surface upon which said wheel rests or to retract said members into inoperative position within the radial limits of said wheel.

6. The combination of an axle, a vehicle wheel rotatably carried thereby, a pair of elongated chock members having elongated apertures through which said axle extends and a set of rack teeth upon one side of each of said apertures, a plate fixed with respect to said axle, means carried by said plate to limit movement of said members to angularly related, downwardly divergent paths, a gear carried by said axle and simultaneously engaging said rack teeth, means to rotate said gear in opposite directions from a remote position, to shift said members into engagement with the surface upon which said wheel rests or to retract said members into inoperative positions within the radial limits of said wheel, a projection carried by and movable with one of said members, and an annular rack carried by and rotatable with said wheel, adapted to be engaged by said projection when its supporting member is in extended operative position.

MARTIN J. MADISON.

REFERENCES CITED

The following references are of record in the file of this patent:

UNITED STATES PATENTS

| Number | Name | Date |
|---|---|---|
| 1,423,846 | Frederick | July 25, 1922 |
| 2,171,352 | Beavon | Aug. 29, 1939 |

FOREIGN PATENTS

| Number | Country | Date |
|---|---|---|
| 262,168 | Great Britain | Dec. 9, 1926 |